Figure 6:
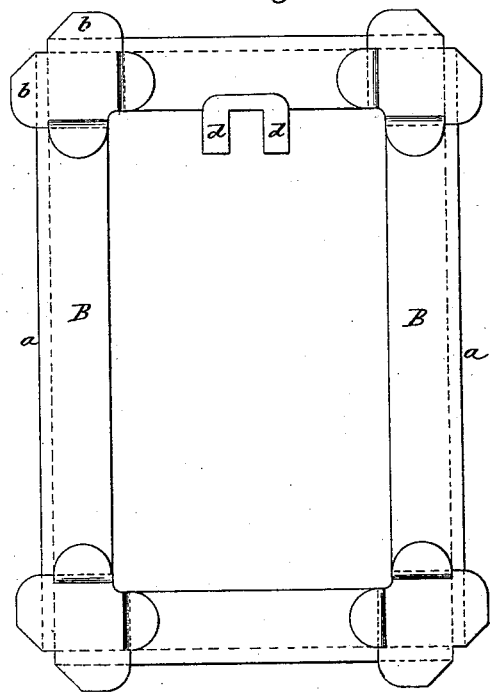

(No Model.) 2 Sheets—Sheet 1.
H. N. GALE.
MOUNT FOR PHOTOGRAPHS.
No. 425,775. Patented Apr. 15, 1890.
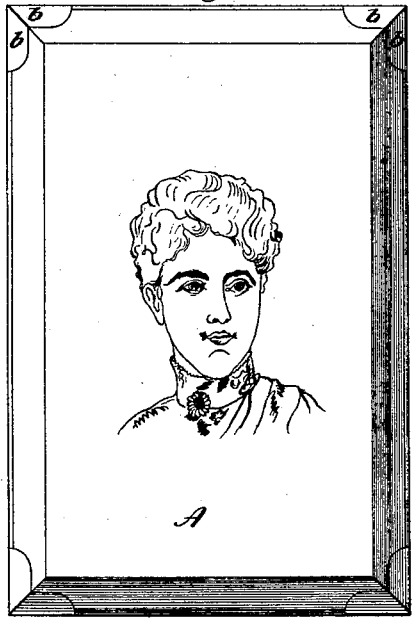
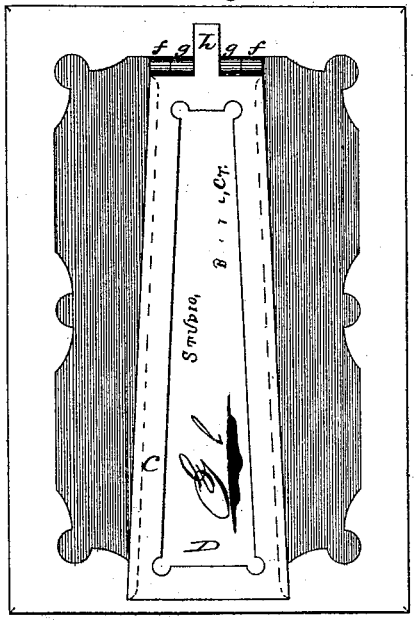
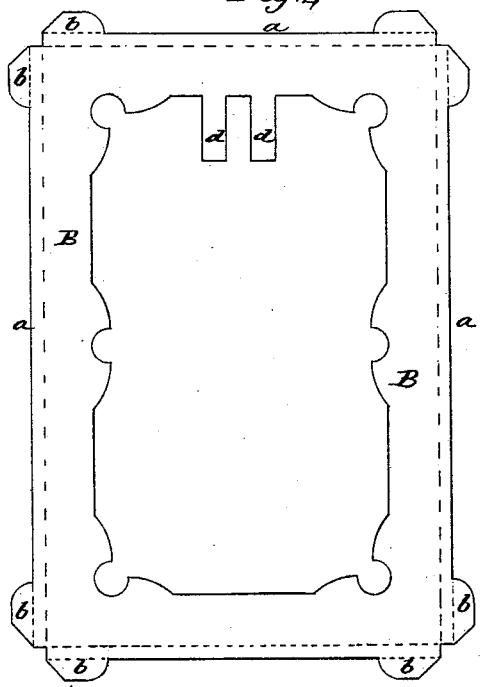
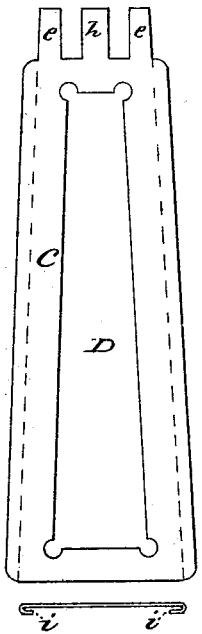
Witnesses  Herbert N. Gale
   Inventor
By Atty.

(No Model.) 2 Sheets—Sheet 2.
H. N. GALE.
MOUNT FOR PHOTOGRAPHS.

No. 425,775. Patented Apr. 15, 1890.

UNITED STATES PATENT OFFICE.

HERBERT N. GALE, OF BRISTOL, CONNECTICUT, ASSIGNOR OF ONE-HALF TO JOHN H. TWISDEN, OF BOSTON, MASSACHUSETTS.

MOUNT FOR PHOTOGRAPHS.

SPECIFICATION forming part of Letters Patent No. 425,775, dated April 15, 1890.

Application filed June 4, 1889. Serial No. 313,034. (No model.)

*To all whom it may concern:*

Be it known that I, HERBERT N. GALE, of Bristol, in the county of Hartford and State of Connecticut, have invented new Improvements in Mounts for Photographs; and I do hereby declare the following, when taken in connection with accompanying drawings, and the letters of reference marked thereon, to be a full, clear, and exact description of the same, and which said drawings constitute part of this specification, and represent, in—

Figure 1, a front view showing the mount as applied to the glass; Fig. 2, an edge view of the same; Fig. 3, a rear view of the same; Fig. 4, the blank from which the mount is produced; Fig. 5, the blank for the brace for the mount, also showing a lower end view of the same complete; Fig. 6, a modification in the construction of the mount.

This invention relates to a device for mounting photographs, the object being to apply the photograph directly upon the back of a glass and then inclose the edge of the glass so as to form a support by which the glass with the photograph may be held in nearly a vertical position; and the invention consists in the construction as hereinafter described, and particularly recited in the claims.

A represents the glass, here shown as with beveled edges. The photograph is applied to the back of the glass in the usual manner. The mount for the photograph thus prepared is made from sheet metal, and is best made in a single piece B, as seen in Fig. 4. The blank is cut from suitable sheet metal of a size slightly larger than the size of the glass, the broken lines, Fig. 4, indicating the size of the glass. This leaves a projecting edge $a$ on the sides, and on the sides and ends at each angle a lip $b$ projects outwardly, and at a convenient point in the plate one or more inwardly-projecting tongues $d$ are formed. The edge of the plate, with the lips, is turned up at right angles, as seen in Fig. 2, the lips in that figure being represented in broken lines. This makes a pocket for the glass. The glass is then laid in the pocket and the lips at the angles turned down over the glass, as seen in Figs. 1 and 2. The flange $a$ around the edge of the plate covers the edge of the glass to give it a neat finish, and the clips secure the glass and plate together, the clips producing an ornamental corner on the surface of the glass. As a support for the photograph thus mounted a brace C is made from sheet metal of the required length and terminating at its upper end in tongues $e$ $e$, corresponding to the tongues $d$ $d$ of the plate B. The tongues $e$ $e$ and the tongues $d$ $d$ are bent to form hinge-ears $f$ and $g$, (see Fig. 2,) through which a pintle is introduced, thus hinging the brace to the back. The brace is constructed with a central tongue $h$, which extends upward and forms a stop against the plate for the brace to limit its opening extent. The brace is best constructed with a vertical opening D through it, and the edges of the brace turned inward to form grooves $i$ to receive a card, for the title of the photograph, name of the photographer, or whatever inscription it may be desirable to place thereon.

While preferring to make the mount in a single piece, it may be made in several pieces—say as represented in Fig. 6—the plate being composed of four sides, with the edge turned up to form the flange $a$ and the corners produced by independent angle-pieces secured to the sides. This illustration will be sufficient to indicate to those skilled in the art that the mount may be made in several pieces of metal.

While describing the invention as a mount for photographs, it will be understood that the mount is applicable to the mounting of other pictures. By the term "photograph," therefore, I do not wish to limit the purpose for which the invention may be employed.

I claim—

1. The herein-described mount for photographs, consisting of a metal plate of a size corresponding to the size of the glass, the plate having an edge turned outward to form a flange $a$, corresponding to the edge of the glass, the flanges on the sides and ends at each angle constructed with projecting lips $b$, adapted to fold over onto the front of the glass, substantially as described.

2. The herein-described mount for photographs, consisting of a metal plate of a size corresponding to the size of the glass, the plate having an edge turned outward to form a flange $a$, corresponding to the edge of the glass, also constructed with lips *b* at the angles, adapted to fold over onto the front of the glass, and also constructed with tongues *d*, combined with a metal brace C, constructed with tongues *e* at its upper end, corresponding to the tongues on the plate, the said tongues of the plate and brace bent to form hinge-ears, with a pintle extending through said ears, substantially as described.

3. A mount for photographs, consisting of the plate B, of a size corresponding to the glass, constructed with an outwardly-projecting flange *a* upon its edges and with projecting lips *b* at its angles, combined with a sheet-metal brace C, hinged to the back, the said brace constructed with a vertical opening D, the edges of the brace turned rearward to form grooves *i*, substantially as described.

HERBERT N. GALE.

Witnesses:
FRED C. EARLE,
J. H. SHUMWAY.